(12) United States Patent
Binstock et al.

(10) Patent No.: US 11,485,194 B2
(45) Date of Patent: Nov. 1, 2022

(54) VENTILATION SYSTEM FOR A POWER MACHINE

(71) Applicant: Clark Equipment Company, West Fargo, ND (US)

(72) Inventors: Mark Binstock, Bismarck, ND (US); Mitchell Pence, Bismarck, ND (US)

(73) Assignee: CLARK EQUIPMENT COMPANY, West Fargo, ND (US)

( * ) Notice: Subject to any disclaimer, the term of this patent is extended or adjusted under 35 U.S.C. 154(b) by 321 days.

(21) Appl. No.: 16/799,564

(22) Filed: Feb. 24, 2020

(65) Prior Publication Data

US 2020/0269651 A1  Aug. 27, 2020

Related U.S. Application Data

(60) Provisional application No. 62/809,290, filed on Feb. 22, 2019.

(51) Int. Cl.
*B60H 1/00*  (2006.01)
*E02F 9/08*  (2006.01)

(52) U.S. Cl.
CPC ..... *B60H 1/00378* (2013.01); *B60H 1/00535* (2013.01); *B60H 1/00564* (2013.01); *E02F 9/0858* (2013.01)

(58) Field of Classification Search
CPC ............ B60H 1/00028; B60H 1/00035; B60H 1/00378; B60H 1/00535; B60H 1/00564; B60H 1/242; E02F 9/0858
USPC ............................................ 296/190.09, 208
See application file for complete search history.

(56) References Cited

U.S. PATENT DOCUMENTS

| | | | |
|---|---|---|---|
| 3,289,564 A * | 12/1966 | De Coye De Castelet ................ | B60H 1/3414 454/127 |
| 3,924,524 A * | 12/1975 | Whisler .................... | B60P 3/00 454/158 |
| 4,379,568 A | 4/1983 | Kerkman | |
| 6,382,712 B1 * | 5/2002 | Bruss ..................... | B60H 1/242 454/127 |
| 9,707,821 B2 | 7/2017 | Hill | |
| 10,464,619 B2 | 11/2019 | Hansen | |
| 2010/0072782 A1 * | 3/2010 | Modzik, Jr ............ | B62D 33/06 296/190.09 |
| 2010/0301638 A1 * | 12/2010 | Hinshaw .............. | F02M 35/164 296/208 |
| 2012/0208446 A1 | 8/2012 | Taylor | |
| 2013/0001984 A1 | 1/2013 | Spencer | |
| 2017/0225725 A1 | 8/2017 | Hansen | |

FOREIGN PATENT DOCUMENTS

| | | |
|---|---|---|
| JP | H11268515 A | 10/1999 |
| JP | 2003200728 A | 7/2003 |

OTHER PUBLICATIONS

International Searching Authority. International Search Report and Written Opinion for application PCT/US2020/019542. dated Jun. 29, 2020.

* cited by examiner

Primary Examiner — Jason S Daniels

(57) ABSTRACT

An HVAC system for a power machine can include a housing configured to be supported on a front frame member of the power machine forward of an operator enclosure. A ductwork section can be connected to the housing and direct air from the housing to a front opening in the operator enclosure.

20 Claims, 10 Drawing Sheets

Prior Art

VENTILATION SYSTEM FOR A POWER MACHINE

CROSS-REFERENCE TO RELATED APPLICATIONS

This application claims priority to U.S. Patent Application No. 62/809,290 filed Feb. 22, 2019, which is hereby incorporated by reference herein in its entirety.

BACKGROUND

This disclosure is directed toward power machines. More particularly, this disclosure relates to improvements for heating, ventilating, and air conditioning ("HVAC") systems for power machines. Power machines, for the purposes of this disclosure, include any type of machine that generates power to accomplish a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Conventional power machines can include integrated HVAC systems that can be mounted, for example, underneath or behind an operator station (e.g., seat) of an operator enclosure. This configuration can require fluid conduits for the air HVAC systems, which direct air from a blower to the interior of the operator enclosure, to be arranged at particular locations and orientations on the power machine. For example, in some conventional arrangements, fluid conduits, including those formed from metal or other thermally conductive material, can be structured to extend along the frame of an operator enclosure. As another example, some conventional fluid conduits can be arranged to extend across moving components, such as lift arm structures. The discussion above is merely provided for general background information and is not intended to be used as an aid in determining the scope of the claimed subject matter.

SUMMARY

Some embodiments of the present disclosure provide optimal arrangements of an HVAC system, or components thereof, on a loader having an articulated frame and a lift arm structure. Some arrangements of HVAC systems, or components thereof, according to the present disclosure can help to avoid certain undesirable routing of fluid conduits of the HVAC systems, including by avoiding routing configurations with potential for excessive thermal losses or risk of adverse wear. Accordingly, some embodiments of the present disclosure provide HVAC systems with improved efficiencies and durability, in comparison with conventional HVAC systems.

In some embodiments, a power machine can include an articulated frame with a front frame member and a rear frame member, with the front frame member being configured to pivot relative to the rear frame member. An operator enclosure can be rigidly coupled to the front frame member, can include a frame, and can be configured to pivot with the front frame member. A heating, ventilating, and air conditioning ("HVAC") system can include an HVAC housing, a blower fan within the HVAC housing, and a rigid ductwork section. The HVAC housing can be supported on the front frame member at least partly forward of the operator enclosure. The rigid ductwork section can be arranged to direct air from the blower fan along a flow path from the HVAC housing to a front opening in the operator enclosure.

In some embodiments, a power machine can include an articulated frame with a front frame member and a rear frame member, with the front frame member being configured to pivot relative to the rear frame member. An operator enclosure can be supported on the front frame member, can have a front panel with an opening, and can be configured to pivot with the front frame member relative to the rear frame member. A lift arm structure can be arranged forward of the front panel and can be configured to move relative to the front frame member under power, with the lift arm structure defining first and second lateral sides of the front frame member. A heating, ventilating, and air conditioning ("HVAC") system can include an HVAC housing, a blower fan within the HVAC housing, and a rigid ductwork section. The HVAC housing can be supported on the front frame member forward of the operator enclosure. The rigid ductwork section can be arranged to direct air from the blower fan along a flow path from the HVAC housing to the opening in the front panel of the operator enclosure. The rigid ductwork section can be disposed on only the first lateral side of the front frame member.

In some embodiments, a power machine can include an articulated frame with a front frame member and a rear frame member, with the front frame member being configured to pivot relative to the rear frame member. An operator enclosure can be supported on the front frame member, can have a frame and an instrument panel, and can be configured to pivot with the front frame member relative to the rear frame member. A lift arm structure can be arranged forward of the operator enclosure and can be configured to move relative to the front frame member under power, with first and second lateral sides of the operator enclosure being defined on opposing lateral sides, respectively, of a path of travel of the lift arm structure. A heating, ventilating, and air conditioning ("HVAC") system can include an HVAC housing, a blower fan within the HVAC housing, and a rigid ductwork section. The HVAC housing can be supported on the operator enclosure at least partly forward of the operator enclosure. The rigid ductwork section can be arranged to direct air from the blower fan along a flow path from the HVAC housing to a front opening in the operator enclosure that is aligned with an inlet to a plenum within the instrument panel, to direct air from the flow path into the plenum. The flow path can extend on only the first lateral side of the operator enclosure. The rigid ductwork may not include any section (i.e., may include no section) that extends along the frame of the operator enclosure.

In some embodiments, a power machine can include an articulated frame with a front frame member and a rear frame member, the front frame member being configured to pivot relative to the rear frame member. An operator enclosure can be supported on the front frame member. The operator enclosure can be configured to pivot with the front frame member relative to the rear frame member and can include an enclosure frame and an operator station that is at least partly enclosed by the enclosure frame. A lift arm structure can be arranged forward of the operator enclosure and can be configured to move relative to the front frame member under power, with first and second lateral portions of the operator enclosure being defined on opposing lateral sides, respectively, of a path of travel of the lift arm structure. A heating, ventilating, and air conditioning ("HVAC") system can include: an HVAC housing, a blower fan within the HVAC housing, and a rigid ductwork section.

The HVAC housing can be supported on the operator enclosure at least partly forward of the operator enclosure. The rigid ductwork section can be arranged to direct air from the blower fan along a flow path from the HVAC housing to a front opening in the operator enclosure. The flow path can extend on only the first lateral portion of the operator enclosure and the rigid ductwork section can include no portion of the enclosure frame.

In some embodiments, a power machine can include an articulated frame with a front frame member and a rear frame member, the front frame member being configured to pivot relative to the rear frame member. An operator enclosure can be supported on the front frame member to define an operator station and can be configured to pivot with the front frame member relative to the rear frame member. A lift arm structure can be arranged forward of the operator station and can be configured to move relative to the front frame member under power, the lift arm structure defining opposing first and second lateral portions of the operator enclosure. A heating, ventilating, and air conditioning ("HVAC") unit can be supported on the front frame member at least partly forward of the operator enclosure and can include an HVAC housing, a blower fan within the HVAC housing, and a rigid ductwork section. The rigid ductwork section can be arranged to direct air from the blower fan along a flow path from the HVAC housing to a front opening in the operator enclosure.

In some embodiments, a heating, ventilating, and air conditioning ("HVAC") system can be configured to interface with a front opening in a front side of an operator enclosure of a power machine with an articulated frame. A housing with a blower fan can be configured to be supported on a front frame member of the power machine forward of the operator enclosure. A ductwork section can be connected to the housing and can be configured to direct air from the blower fan along a flow path from the housing to the front opening in the operator enclosure.

This Summary and the Abstract are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter.

DRAWINGS

DESCRIPTION

The concepts disclosed in this discussion are described and illustrated by referring to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Some discussion below describes improved arrangements for HVAC systems of power machines, including HVAC systems for use with a loader that has an articulated frame and a lift arm structure. Some embodiments can exhibit substantial improvements over conventional HVAC arrangements. For example, in some embodiments, arranging an HVAC system on a front side of an operator enclosure of a power machine can eliminate the need to route fluid conduits along the frame of the operator enclosure. This can advantageously reduce thermal losses and increase the efficiency of the HVAC system. In some embodiments, an HVAC system, or components thereof, mounted at a front of an operator enclosure can include rigid ductwork sections. Further, in some embodiments, part or all of an air flow path for an HVAC system, including as may be defined by certain rigid (or other) ductwork sections, can be arranged to extend only on one lateral side of a lift arm structure or lift arm path, as may be useful to avoid adverse wear on or damage to the relevant HVAC components due to movement of the lift arm structure.

Generally, an HVAC system according to this disclosure includes at least a device configured to move air through a partially closed system (e.g., a set of ducts) to a target area, such as an operator enclosure of a power machine. In some embodiments, HVAC systems can include or be in fluid communication with one or more devices for heating, cooling, or otherwise conditioning air, as well as one or more devices to move air to a target area. In some embodiments, HVAC systems may include air movers but no conditioning devices, or may include only certain types of conditioning devices, such as only heaters or only air conditioners (i.e., air coolers) but not other types of conditioning devices. For the purposes of this discussion, the term HVAC refers to air treatment systems that may or may not include heating and/or air conditioning.

Figure 2:
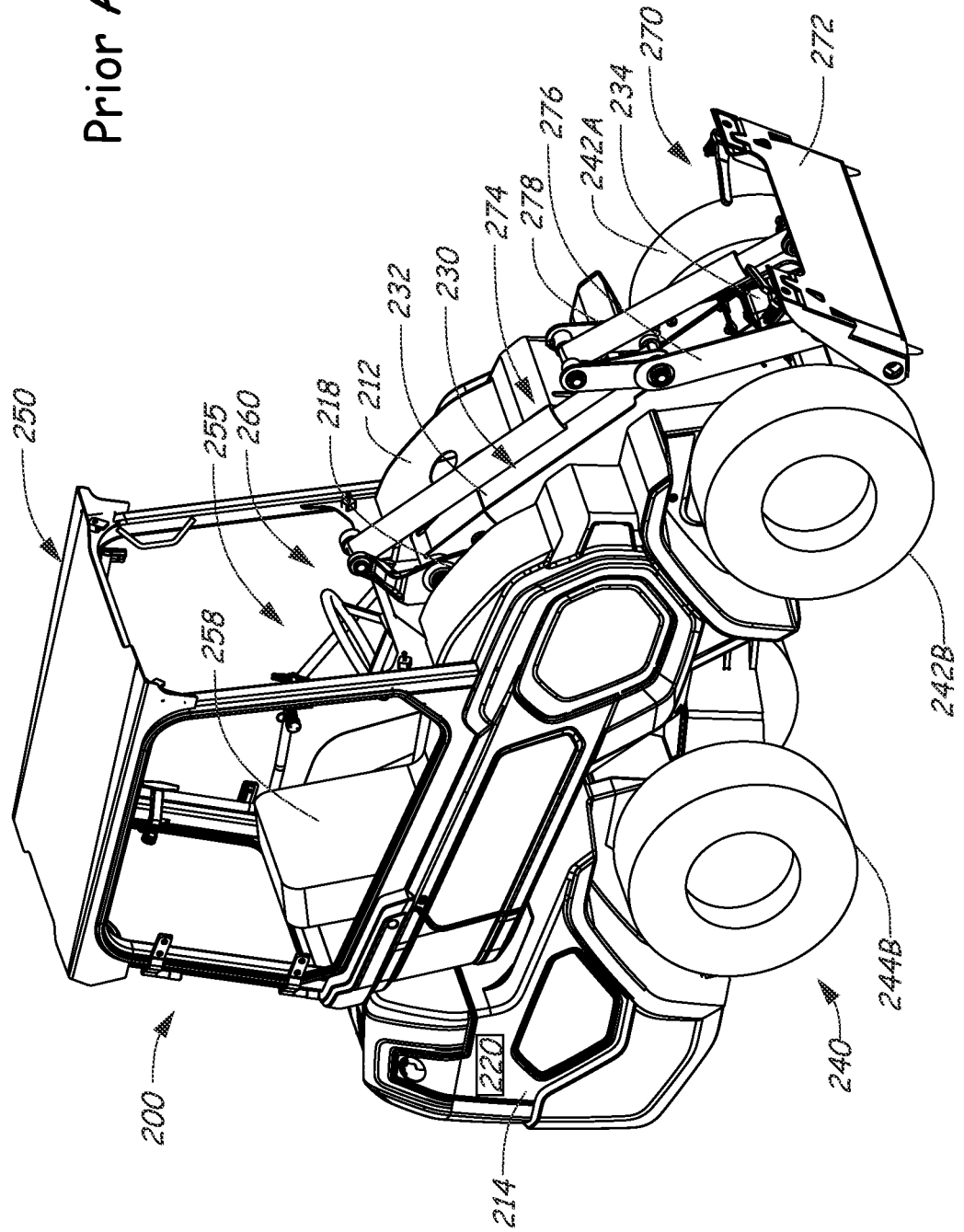
FIG. 2 is a perspective view showing generally a front of a power machine in the form of a small articulated loader on which embodiments disclosed in this specification can be advantageously practiced.
Figure 3:
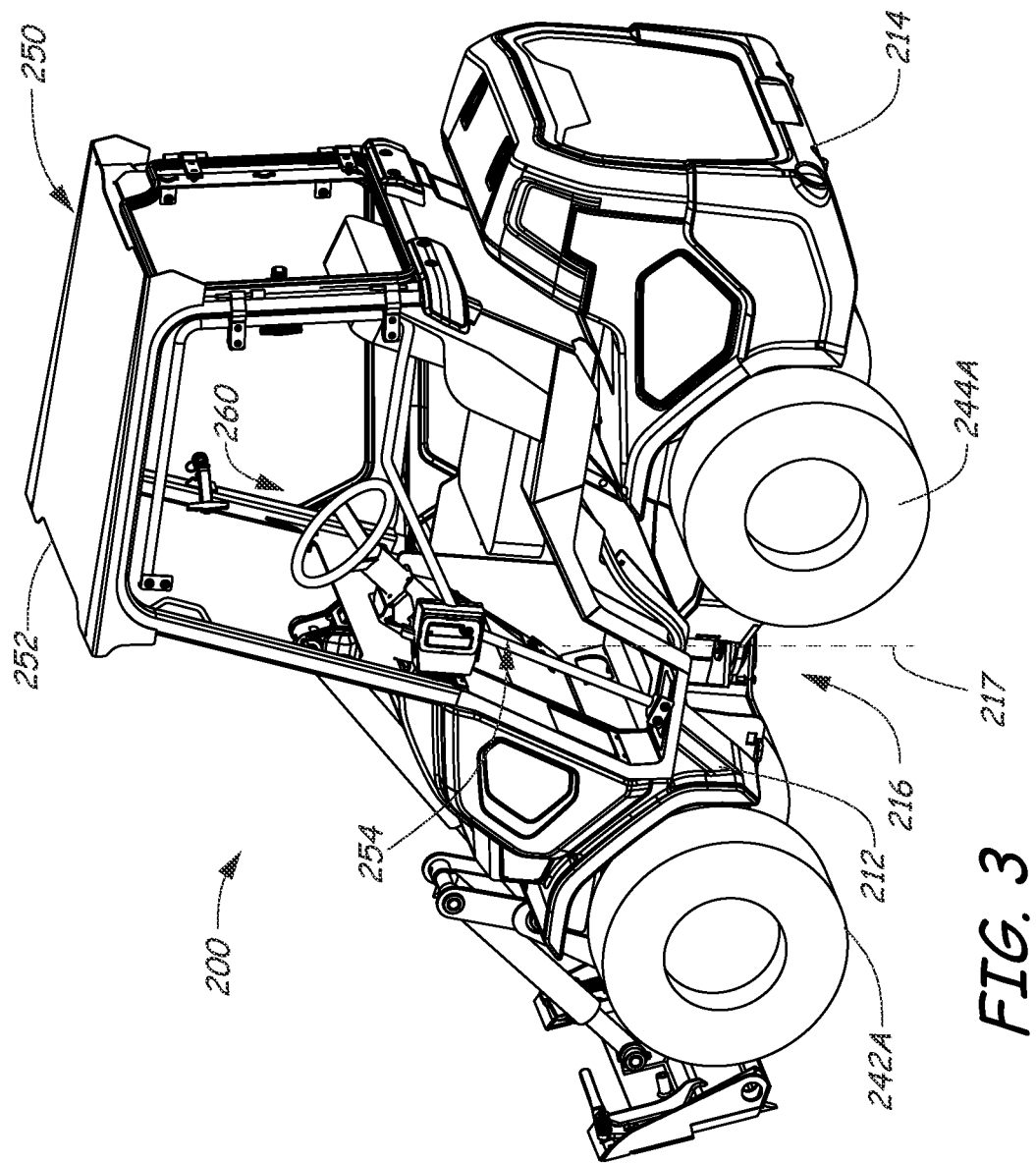
FIG. 3 is a perspective view showing generally a back of the power machine shown in FIG. 2.

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is discussed. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

Some embodiments of the disclosure are presented below in the context of articulated loaders, with certain components of HVAC systems arranged on and secured to pivotable front frames of the articulated loaders. In some embodiments, HVAC systems according to the disclosure can be used on other types of power machines, including non-articulated power machines.

Figure 1:
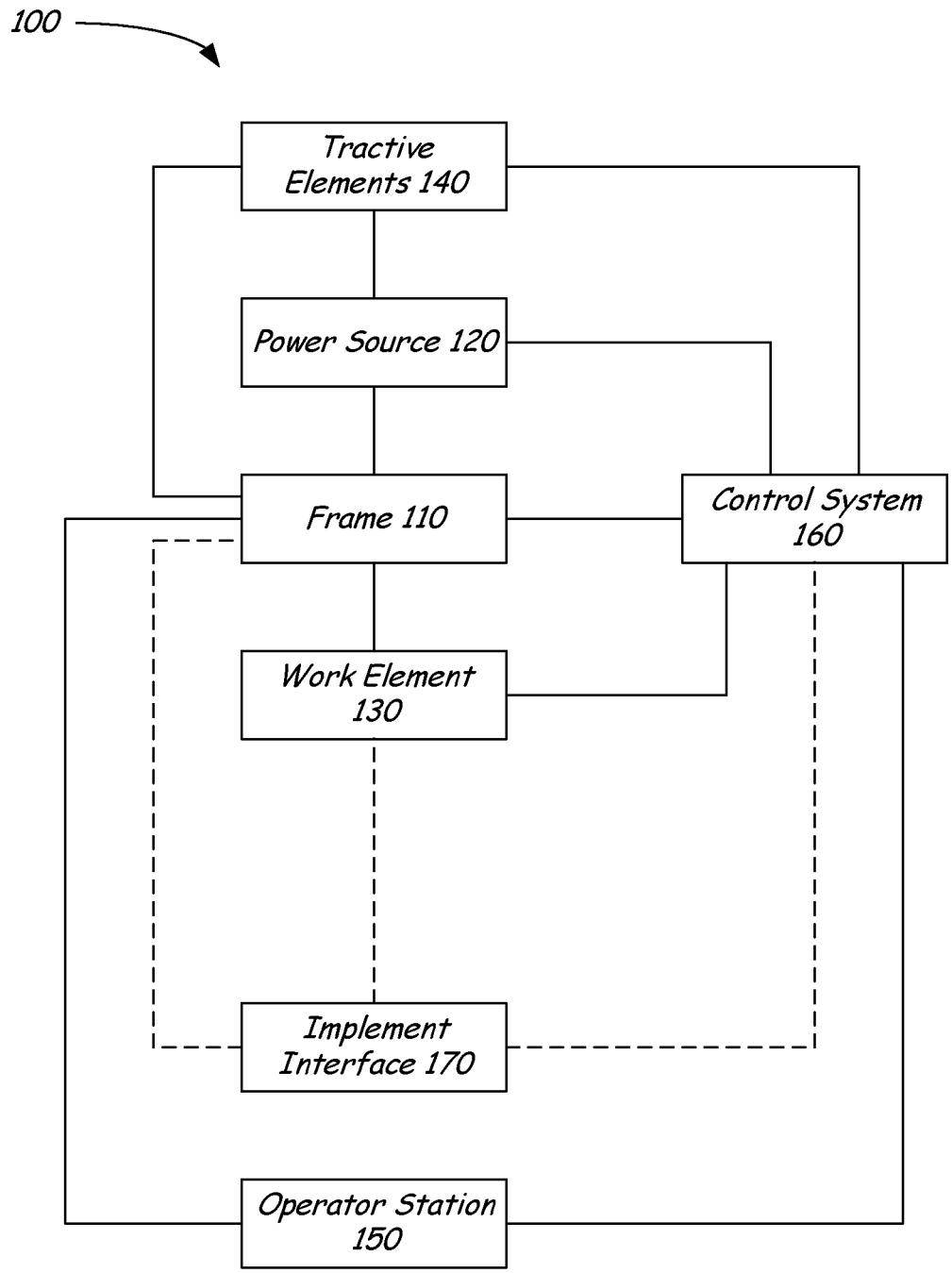
FIG. 1 is a block diagram illustrating functional systems of a representative power machine on which embodiments of the present disclosure can be advantageously practiced.

FIG. 1 illustrates a block diagram illustrates the basic systems of a power machine 100 upon which the embodiments discussed below can be advantageously incorporated and can be any of a number of different types of power machines. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. In some instances, the implement can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, the implement carrier is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which can provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, wheels attached to an axle, track assemblies, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether they have operator compartments, operator positions or neither, may be capable of being operated remotely (i.e. from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e. remote from both the power machine and any implement to which is it coupled) that is capable of controlling at least some of the operator-controlled functions on the power machine.

FIGS. 2-3 illustrates a loader 200, which is one particular example of a power machine of the type illustrated in FIG. 1 where the embodiments discussed below can be advantageously employed. Loader 200 is an articulated loader with a front mounted lift arm structure 230, which in this example is a telescopic lift arm. Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. The description herein of loader 200 with references to FIGS. 2-3 provides an illustration of the environment in which the embodiments discussed below. This description should not be considered limiting especially as to the description of features that loader 200 that are not essential to the disclosed embodiments. Such features may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220 that can generate or otherwise provide power for operating various functions on the power machine. Frame 210 also supports a work element in the form of lift arm structure 230 that is powered by the power system 220 and that can perform various work tasks. As loader 200 is a work vehicle, frame 210 also supports a traction system 240, which is also powered by power system 220 and can propel the power machine over a support surface. The lift arm structure 230 in turn supports an implement interface 270 that includes an implement carrier 272 that can receive and secure various implements to the loader 200 for performing various work tasks and power couplers located generally at 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices to cause the power machine to perform various work functions. Cab 250 includes a canopy 252 that provides a roof for the operator compartment and is configured to have an entry 254 on one side of the seat (in the example shown in FIG. 3, the left side) to allow for an operator to enter and exit the cab. Although cab 250 as shown does not include any windows or doors, a door or windows can be provided.

The operator station 255 includes an operator seat 258 and the various operation input devices 260, including control levers that an operator can manipulate to control various machine functions. Operator input devices can include a steering wheel, buttons, switches, levers, sliders, pedals and the like that can be stand-alone devices such as hand operated levers or foot pedals, included on one or more instrument panels, or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive system 240, the lift arm structure 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to providing dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include and/or interact with the embodiments discussed below can have various different frame components that support various work elements. The elements of frame 210 discussed herein are provided for illustrative purposes and should not be considered to be the only type of frame that a power machine on which the embodiments can be practiced can employ. As mentioned above, loader 200 is an articulated loader and as such has two frame members that are pivotally coupled together at an articulation joint. For the purposes of this document, frame 210 refers to the entire frame of the loader. Frame 210 of loader 200 includes a front frame member 212 and a rear frame member 214. The front and rear frame members 212, 214 are coupled together at an articulation joint 216. Actuators (not shown) are provided to rotate the front and rear frame members 212, 214 relative to each other about an axis 217 to accomplish a turn.

The front frame member 212 supports and is operably coupled to the lift arm 230 at joint 216. A lift arm cylinder (not shown, positioned beneath the lift arm 230) is coupled to the front frame member 212 and the lift arm 230 and is operable to raise and lower the lift arm under power. The front frame member 212 also supports front wheels 242A and 242B. Front wheels 242A and 242B are mounted to rigid axles (the axles do not pivot with respect to the front frame member 212). The cab 250 is also supported by the front frame member 212 so that when the front frame member 212 articulates with respect to the rear frame member 214, the cab 250 moves with the front frame member 212 so that it will swing out to either side relative to the rear frame member 214, depending on which way the loader 200 is being steered.

The rear frame member 214 supports various components of the power system 220 including an internal combustion engine. In addition, one or more hydraulic pumps are coupled to the engine and supported by the rear frame member 214. The hydraulic pumps are part of a power conversion system to convert power from the engine into a form that can be used by actuators (such as cylinders and drive motors) on the loader 200. Power system 220 is discussed in more detail below. In addition, rear wheels 244A and 244B are mounted to rigid axles that are in turn mounted to the rear frame member 214. When the loader 200 is pointed in a straight direction (i.e., the front frame portion 212 is aligned with the rear frame portion 214) a portion of the cab is positioned over the rear frame portion 214.

The lift arm structure 230 shown in FIGS. 2-3 is one example of many different types of lift arm structures that can be attached to a power machine such as loader 200 or other power machines on which embodiments of the present discussion can be practiced. The lift arm structure 230 is a radial lift arm structure, in that the lift arm is mounted to the frame 210 at one end of the lift arm structure and pivots about the mounting joint 216 as it is raised and lowered. The lift arm structure 230 is also a telescoping lift arm. The lift arm structure includes a boom 232 that is pivotally mounted to the front frame member 212 at joint 216. A telescoping member 234 is slidably inserted into the boom 232 and telescoping cylinder (not shown) is coupled to the boom and the telescoping member and is operable to extend and retract the telescoping member under power. The telescoping member 234 is shown in FIGS. 2 and 3 in a fully retracted position. The implement interface 270 including implement carrier 272 and power couplers 274 are operably coupled to the telescoping member 234. An implement carrier mounting structure 276 is mounted to the telescoping member. The implement carrier 272 and the power couplers 274 are mounted to the positioning structure. A tilt cylinder 278 is pivotally mounted to both the implement carrier mounting structure 276 and the implement carrier 272 and is operable to rotate the implement carrier with respect to the implement carrier mounting structure under power. Among the operator controls 260 in the operator compartment 255 are operator controls to allow an operator to control the lift, telescoping, and tilt functions of the lift arm structure 230.

Other lift arm structures can have different geometries and can be coupled to the frame of a loader in various ways to provide lift paths that differ from the radial path of lift arm structure 230. For example, some lift paths on other loaders provide a radial lift path. Others have multiple lift arms coupled together to operate as a lift arm structure. Still other lift arm structures do not have a telescoping member. Others have multiple segments. Unless specifically stated otherwise, none of the inventive concepts set forth in this discussion are limited by the type or number of lift arm structures that are coupled to a particular power machine.

Figure 4:
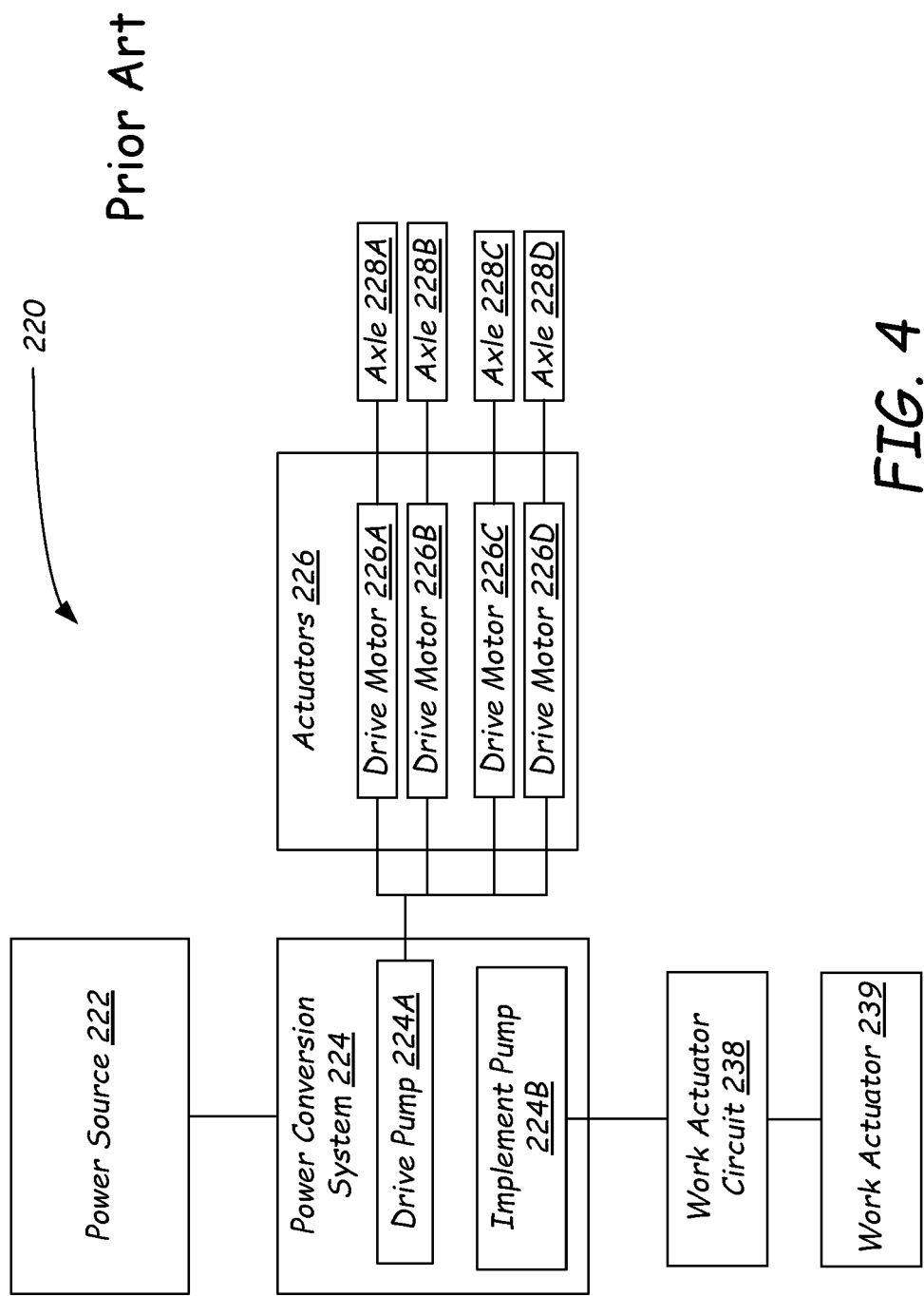
FIG. 4 is a block diagram illustrating components of a power system of a loader such as the loader of FIGS. 2-3.

FIG. 4 illustrates power system 220 in more detail. Broadly speaking, power system 220 includes one or more power sources 222 that can generate and/or store power for operating various machine functions. On loader 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a hydrostatic drive pump 224A, which provides a power signal to drive motors 226A, 226B, 226C and 226D. The four drive motors 226A, 226B, 226C and 226D in turn are each operably coupled to four axles, 228A, 228B, 228C and 228D, respectively. Although not shown, the four axles are coupled to the wheels 242A, 242B, 244A, and 244B, respectively. The hydrostatic drive pump 224A can be mechanically, hydraulically, and/or electrically coupled to operator input devices to receive actuation signals for controlling the drive pump. The power conversion system also includes an implement pump 224B, which is also driven by the power source 222. The implement pump 224B is configured to provide pressurized to a work actuator circuit 238. Work actuator circuit 238 is in communication with work actuator 239. Work actuator 239 is representative of a plurality of actuators, including the lift cylinder, tilt cylinder, telescoping cylinder, and the like. The work actuator circuit 238 can include valves and other devices to selectively provide pressurized hydraulic fluid to the various work actuators represented by block 239 in FIG. 4. In addition, the work actuator circuit 238 can be configured to provide pressurized hydraulic fluid to work actuators on an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5:
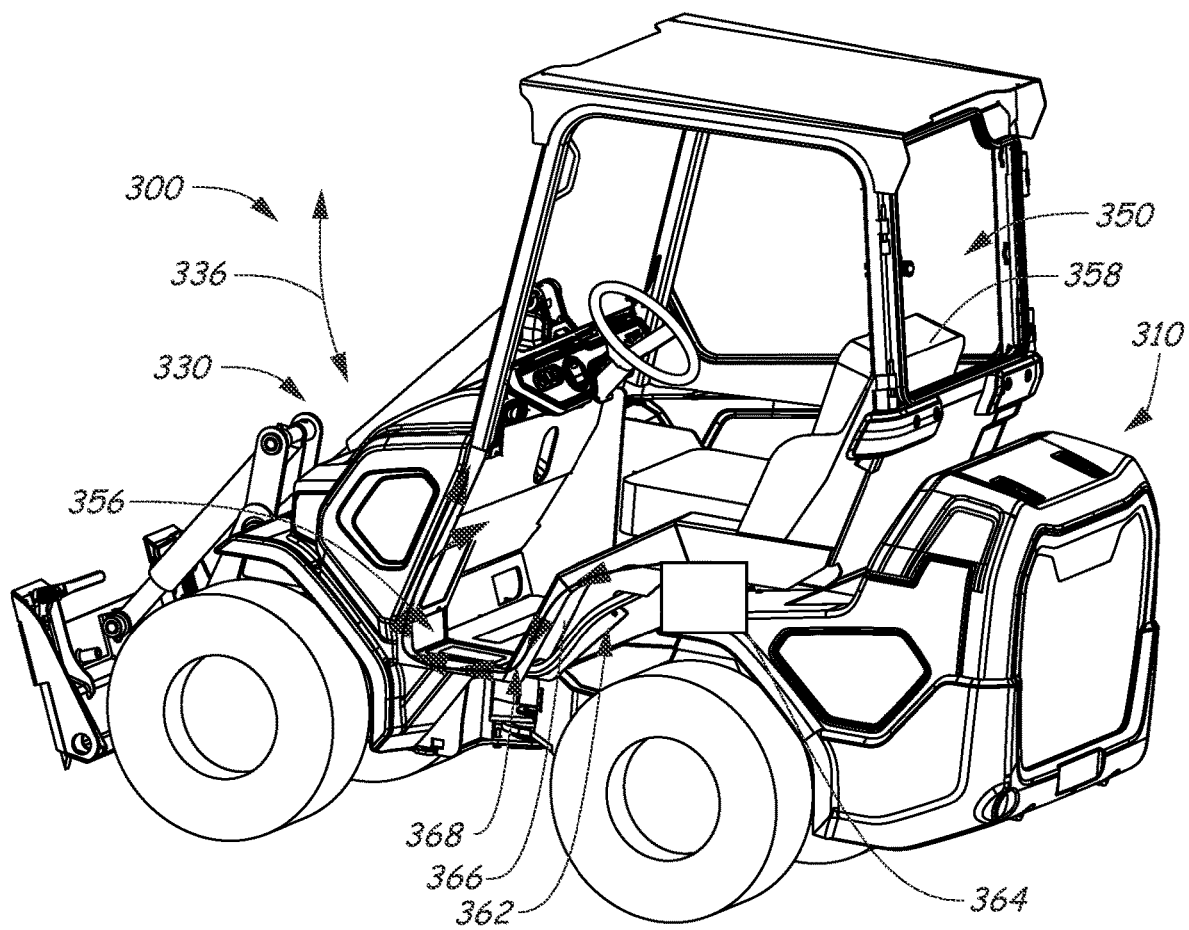
FIG. 5 is a perspective view showing generally a back of the power machine of FIGS. 2 and 3, illustrating a conventional placement of an HVAC system.

FIG. 5 illustrates an example of a loader 300, which is one particular example of the power machine 100 illustrated broadly in FIG. 1 and discussed above, and relative to which the embodiments discussed herein can be advantageously employed. The loader 300 is similar in some ways to the loader 200 described above and like numbers represent similar parts. For example, like the loader 200, the loader 300 includes an articulated frame 310, a lift arm structure 330, and an operator enclosure that is at least partly defined by a cab 350. Although the cab 350 as shown does not include any windows or doors, a door or windows can be provided, including a door or windows arranged to complete a fully enclosed compartment for the cab 350.

A conventional arrangement for an HVAC system 362 is shown schematically in FIG. 3, superimposed over the loader 300. Among other components, such as a heater or air conditioner (not shown), the HVAC system 362 includes a blower 364 that is mounted below the cab 350 and, in particular, below an operator seat 358 within the cab 350. A ductwork section 366 is formed as part of, or at least coextensive with (i.e., extending substantially along), a lower frame 356 of the cab 350. The ductwork section 366 extends fully between the blower 364 and one or more outlets (e.g., vents 382) into the interior of the cab 350. In this configuration, the HVAC system 362 directs air from the blower 364, along an air-flow path 368 that is defined by the ductwork section 366, and into the cab 350.

Although this arrangement can provide useful heating or cooling of the cab 350, it may result in certain inefficiencies. For example, due to the arrangement of the ductwork section 366 to extend as part of, or at least coextensively along, the lower frame 356 of the cab 350, the ductwork section 366 may be substantially exposed to the surrounding environment. For example, in the illustrated embodiment, a wall of the frame 356 may be the only structure isolating the air-flow path 368 from the ambient air that surrounds the loader 300. Accordingly, depending on environmental conditions and the temperature of the air flowing through the ductwork section 366, substantial amounts of heat may be transferred into or out of the ductwork section 366, thereby resulting in relatively substantial undesired heat gain or loss for the HVAC system 362 generally.

The noted thermal inefficiency can decrease energy efficiencies of the loader 300 in general (e.g., by requiring consumption of additional fuel), can increase wear on the HVAC components (e.g., by increased workload for those components), and can create an uncomfortable environment within the operator enclosure (e.g., due to an increase in the time required to heat or cool the operator enclosure relative to the surroundings).

Thermal losses (or gains) via the ductwork section 366 may be particularly large in some cases due to the ductwork section 366 and the frame 356 being formed from metal or other durable, conductive materials. Further, the rugged environments in which the loader 300 may be used may result in rapid degradation of insulating material that might be employed along the flow path 368, which may be generally unshielded relative to the environment due to the relatively exposed location of the ductwork section 366 along the lateral side of the frame 356. Accordingly, with the ductwork section 366 arranged as shown, certain inefficiencies may be somewhat unavoidable.

FIG. 5 also illustrates example locations of the vents 380, 382 to direct heated or cooled air from the air-flow path 306 into the cab 350. Of particular note, in order to provide appropriate distribution of air flow within the cab 350, the vents 380, 382 (or others) are disposed on opposing lateral sides of the cab 350 (e.g., to the left and right of an operator, respectively). Accordingly, the air-flow path 368 may be required to extend laterally across a path of travel of the lift arm structure 330 (e.g., a path of travel as represented by arrow 336). The extension of the air-flow path 368 across the path of travel of the lift arm structure 330 can be undesirable, as it may expose the relevant ductwork or other air-flow devices to potential damage from the lift arm structure 330. For example, flexible tubing or other ductwork arranged to extend the air-flow path 368 across the lift arm structure 330 may be initially aligned to avoid contact with the lift arm structure 330, but may be at risk of being crushed, torn, or otherwise damaged if accidentally moved out of the initial alignment and into the path of travel 336 (e.g., due to operation of the loader 300 in rugged environments).

Embodiments of the disclosure can address one or more of the issues noted above, or others. For example, some embodiments of the invention can include an HVAC system with an HVAC housing that is mounted forward of (e.g., mounted to a front wall of) an operator enclosure. In some embodiments, such a housing may be a housing for a blower. A rigid duct can extend from the HVAC housing to define a direct flow path, from the HVAC housing to the operator enclosure, that extends only along one lateral side of a lift arm structure (i.e., does not laterally across the lift arm structure) and that does not extend along (e.g., within) a structural frame of the operator enclosure. In this way, for example, the HVAC system can provide a flow path for air into the operator enclosure that may be subject to significantly reduced heat loss as compared, for example, to the flow path 368 of FIG. 5, and that may be significantly less susceptible to damage from operation of the lift arm structure than many conventional arrangements.

Embodiments of the disclosure can also address issues with installation, maintenance, and operation of HVAC systems. For example, the reduced length of ductwork (and the enclosed flow path) of a front-mounted HVAC unit (e.g., with a blower housing and a rigid ductwork section), as compared to many conventional designs, can allow for faster and more effective delivery air to an operator enclosure, among other benefits, due to reduce thermal losses. Accordingly, climate control for an operator enclosure can be more quickly and effectively implemented than with many conventional designs.

Additionally, the relatively small footprint of some embodiments, including as a whole and relative to particular ductwork sections, can help to decrease installation and maintenance time. For example, in some embodiments, an HVAC system including a blower, a bower housing, and ductwork section from the housing to an operator station, may be relatively compact as compared to conventional systems. Accordingly, the HVAC system, and components thereof, may be relatively easily arranged for mounting at one particular location on a loader at any number of stages during manufacturing.

The relatively compact size of some embodiments may also be helpful during maintenance. For example, in conventional systems, in which ductwork extends along (e.g., within) lengthy portions of a frame, finding a leak, or replacing parts of the ductwork (as needed) can be difficult. In contrast, some embodiments according to this disclosure can include a relatively compact HVAC unit overall, with a relatively short ductwork section that does not flow within or otherwise along any structural frame member of the relevant power machine. Accordingly, such an HVAC unit can be collectively or partially evaluated, repaired, or replaced relatively quickly and easily.

As still another advantage for some embodiments, mounting of an HVAC system primarily (or only) at a front part of an operator enclosure can improve manufacturing workflow and provide better space utilization for a power machine in general. For example, in contrast to components mounted at less-accessible parts of a system (e.g., underneath an operator station, as shown in FIG. 5), HVAC systems according to some embodiments can be mounted to a front part of a power machine, forward of an operator enclosure. The accessibility of this part of the power machine can allow such HVAC systems to be installed at a variety of points in a manufacturing process, including after operations to install other components that might tend to damage or be impeded by the HVAC systems. Additionally, for embodiments that can be installed without extending laterally across a lift arm path of a lift arm (e.g., with rigid ductwork along only one lateral portion of an operator enclosure), installers may need to take less care to ensure proper securement of hoses, ductwork, or other components that might otherwise be susceptible to damage by the lift arm. Further, the front positioning of HVAC systems according to some embodiments can provide better space utilization as compared to conventional designs, freeing other parts of a power machine (e.g., near the blower 364 as shown in FIG. 5) for installation of other components or expansion of an operator enclosure, while also helping to separate and insulate operators from vibrations and noise from a blower fan or other HVAC components.

Figure 6:
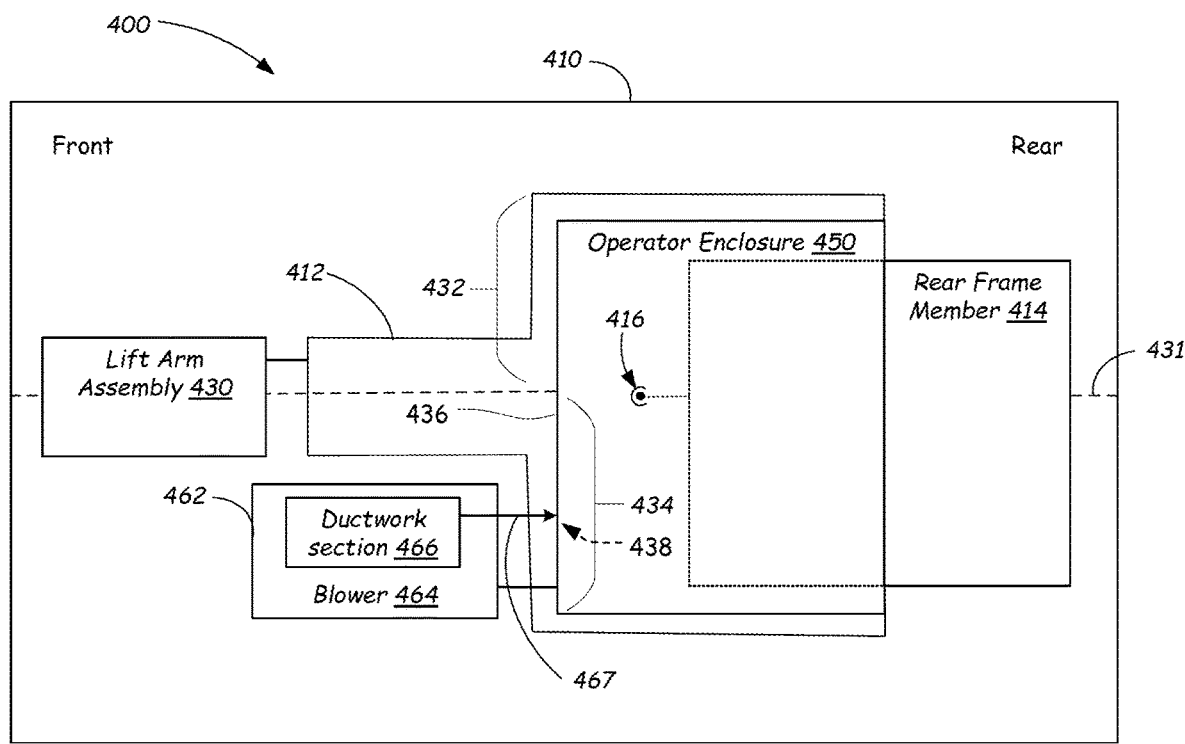
FIG. 6 is a block diagram illustrating components of a power machine of the type on which the disclosed embodiments can be practiced, including an HVAC system according to embodiments of the disclosure.

FIG. 6 shows a block diagram that provides a generalized plan-view schematic of a loader 400 on which the embodiments discussed herein can be advantageously employed. The loader 400 is one particular example of the power machine 100 illustrated broadly in FIG. 1 and discussed above. The loader 400 is similar in some ways to the loaders 200, 300 described above, with like numbers representing similar parts (unless otherwise indicated). For example, the loader 400 includes an articulated frame 410, a lift arm structure 430, and an operator enclosure 450 that is at least partly defined by a cab (not specifically shown). In some embodiments, like the cab 350, the enclosure 450 can include a door or windows that are arranged to complete a fully enclosed compartment for the enclosure 450.

To accommodate particular operations, the frame 410 includes a front frame member 412 that is coupled at an articulated joint 416 to a rear frame member 414. This arrangement allows the front of the loader 400, including the operator enclosure 450, to pivot relative to the rear of the loader, via the articulation joint 416, about an axis that extends into and out of the page in FIG. 6. Although the articulation joint 416 is illustrated in FIG. 6 at a particular location relative to the operator enclosure 450, with corresponding relative sizes of the front and rear of the loader 400, other configurations are possible, including configurations with different proportions of the operator enclosure 450 extending forward or rearward of the articulation joint 416 or otherwise disposed relative to the front and rear frame members 412, 414 of the loader 400.

Like the lift arm structures 230, 330, the lift arm structure 430 can move along a path of travel (not shown in FIG. 6) that may be generally vertical (i.e., into and out of the page in FIG. 6). As supported on the front frame member 412, the lift arm structure 430 (and a front-to-back projection of the path of travel of the lift arm structure 430) defines opposite lateral sides of the loader 400, on opposing lateral sides of a horizontal axis 431. Correspondingly, the front frame member 412, the operator enclosure 450, and the rear frame member 414 are also divided by the lift arm structure 430 and the horizontal axis 431 into opposing lateral portions 432, 434.

Although the horizontal axis 431 is shown in FIG. 6 as generally bisecting the lift arm assembly 430 and the operator enclosure 450, and as intersecting with the articulation joint 416, other locations of a reference horizontal axis are possible. In some configurations, a horizontal axis that divides an enclosure into opposing lateral portions can intersect a pivot point (e.g., a main pin) of a lift arm structure.

In some embodiments, a lift arm may be configured to rotate about multiple axes at or relative to a connection with a frame, such as may allow raising and lowering of the lift arm as well as lateral pivoting of the lift arm. In such configurations, a horizontal axis that defines opposing lateral portions of a frame or of an operator enclosure can extend through a particular pivot axis of the lift arm (e.g., a pivot axis for vertical movement of the lift arm), can extend along a front-to-back projection of a centralized lift path of the lift arm, or can be otherwise arranged.

The loader 400 also includes an HVAC system 462 that includes, among other components, a blower 464 and a ductwork section 466, which, in the embodiment shown in FIG. 6 is positioned above the blower 464. In some embodiments, the blower 464, a housing for the blower 464, and the ductwork section 466 can be manufactured as a collective HVAC unit, which can be installed as a unit or in separate pieces. Although not illustrated in FIG. 6, the HVAC system 462 can also include one or more heaters, cooling systems (e.g., air conditioning units including compressors, evaporator coils, etc.), humidifiers, dehumidifiers, sensors (e.g., temperature sensors), and so on. In the illustrated embodiment, the HVAC system 462 is coupled (e.g., directly mechanically secured) at a front side of the operator enclosure 450 and is thereby indirectly supported by the front frame member 412. Other configurations are possible, however, including configurations in which the HVAC system 462 is directly supported by the front frame member 412 or other portions of the loader 400.

The ductwork section 466 of the HVAC system 462 extends between the blower 464 and the operator enclosure 450 to define a flow path 467 to direct air from the blower to the operator enclosure 450. Generally, the ductwork section 466 is configured to interface with an opening in the operator enclosure 450 to deliver airflow thereto and can be formed from an integrated ducting assembly, with one or more duct pieces, including integrally formed one-piece ducts or other arrangements. In some embodiments, a ductwork section can extend fully to or into a front opening in an operator enclosure, such as an opening in a front panel of the operator enclosure 450, although other configurations are possible. For example, the ductwork section 466 can connect to or otherwise interface with other components, including manifolds (e.g., boots) or sealing elements, that are arranged between the ductwork section and the operator enclosure 450. In some embodiments, the flow path 467 may extend substantially though only the ductwork section 466, between a housing for the blower 464, and a front opening 438 of the operator enclosure 450. In other words, the flow path 467 may extend only through the ductwork section 466, aside from any sealing elements (e.g., gaskets) or manifolds between the ductwork section 466 and either of the front opening 438 or a housing for the blower 464.

In some embodiments, the ductwork section 466 can be a rigid ductwork section, such as may be defined by a unitary sheet-metal construction or other arrangement. In this regard, for example, the ductwork section 466 may exhibit significant durability and reliability. Alternatively, the ductwork can be made of other suitable materials, including various polymers.

The HVAC system 462, including the ductwork section 466, is located on the front portion of the loader 400 and, in particular, to the front (i.e., forward) of the operator enclosure 450. Moreover, the ductwork section 466, and the flow path 467 defined by the ductwork section 466, extend solely along one side of the axis 431, the lift arm structure 430, and a lift arm path of the lift arm structure 430 (e.g., along the lateral portion 434, to the left of the lift arm structure 430, as shown in FIG. 6). Accordingly, the ductwork section 466 and the flow path 467 between the blower 464 and the operator enclosure 450 may be arranged to generally avoid contact (e.g., to be out of vertical alignment), with any part of the lift arm structure 430 during operation of the lift arm structure 430. In other embodiments, other configurations are possible, including arrangement of the HVAC system 462 as a whole, or the ductwork section 466 and the flow path 467 in particular, on another side of the horizontal axis 431. In some embodiments, including as shown in FIG. 6, an entire HVAC unit, including a blower (e.g., the blower 464), a housing for the blower, and ductwork from the housing to an operator enclosure (e.g., the ductwork section 466) can extend only along a front of an enclosure and only along a single lateral portion thereof.

In some embodiments, the mounting of an HVAC system forward of an operator enclosure can result in improved efficiency in utilization of space for a loader. For example, this arrangement can allow for other space, where HVAC systems are typically mounted, to be used for other components or to expand the available space for operators within an operator enclosure. Further, as also noted above, front-mounted HVAC systems can be relatively easily installed and accessed for maintenance (e.g., simply be removing a front panel of a power machine), and placement of potentially noisy or vibrating components (e.g., blowers) away from operators can generally improve user experience.

As another substantial benefit, in the arrangement shown in FIG. 6, air flow from the blower 464 to the operator enclosure 450 may not need to pass substantially along (or through) any portion of a frame of the operator enclosure 450. For example, the flow path 467 can be defined exclusively by the ductwork section 466 and can extend directly from an HVAC housing (not shown in FIG. 6) to an opening in the front operator enclosure 450 (e.g., an opening in a front panel of the operator enclosure 450). Accordingly, undesired heat loss (or gain) along the flow path 467 may be substantially reduced relative to conventional arrangements. Further, with appropriate configuration of the ductwork section 466 (and the HVAC system 462 generally) the flow path 467 may be configured to be relatively short, including due to the close proximity of the front-mounted HVAC system 462 to associated forward air-flow openings (not shown in FIG. 6) into the operator enclosure 450. Thus, for example, the HVAC system 462 can not only suffer from lower thermal losses than conventional systems but can also more effectively adjust the temperature of, or otherwise condition, the internal volume of the operator enclosure 450. For example, the relatively short length of the ductwork section 466, as compared to some conventional arrangements, can result in a decreased amount of relatively stagnant air within the HVAC system 462, which may be subject to thermal losses relative to the environment. Generally, therefore, use of the HVAC system 462 can provide a more comfortable experience for an operator.

Correspondingly, in some embodiments, a flow path (e.g., the flow path 467 as defined by the ductwork section 466) can be configured to be substantially straight (e.g., deviating by 5%, 10%, or 15% or less) relative to a particular horizontal axis (e.g., the axis 431). In some cases, this can simplify manufacturing and installation and also help to ensure that relevant components (e.g., the ductwork section 466) do not extend laterally across a lift arm path or other reference line. In some embodiments, a flow path can extend, relative to a front-to-back direction, substantially in parallel with a horizontal axis that separates an operator enclosure into opposing lateral portions, such as an axis defined by a lift arm path of a power machine.

Figure 7:
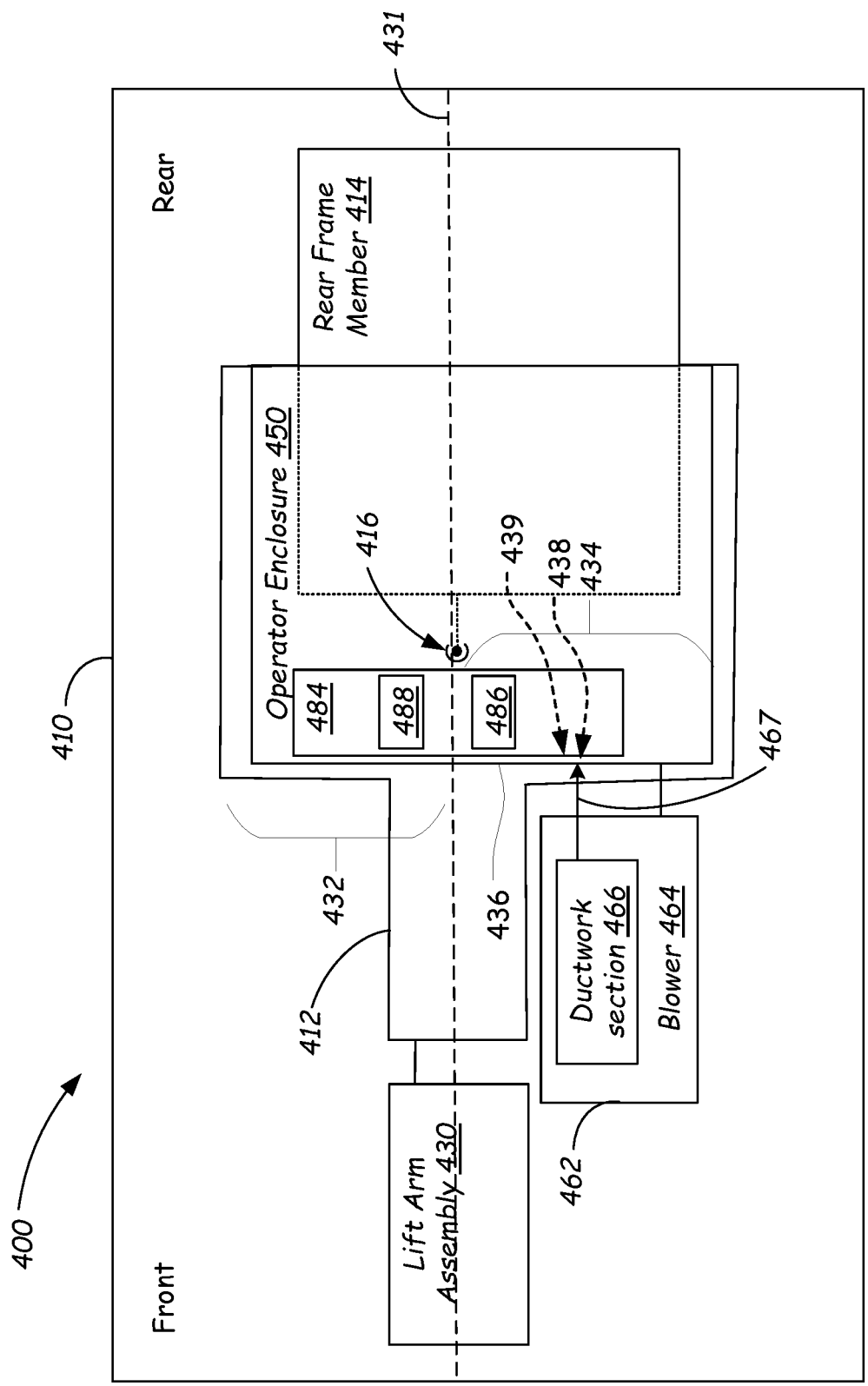
FIG. 7 is another block diagram illustrating components of a power machine of the type on which the disclosed embodiments can be practiced, including an HVAC system according to embodiments of the disclosure.

FIG. 7 shows another example generalized plan-view schematic of a configuration of the loader 400 and, in particular, of the HVAC system 462. In the configuration shown in FIG. 7, the operator enclosure 450 houses an instrument panel 484, such as may include one or more input devices (not shown) for control of the loader 400. The instrument panel 484 is configured as (or otherwise includes) an internal plenum and includes a set of vents, including vents 486, 488, in fluid communication with the plenum. Accordingly, to direct air from the HVAC system 462 into the operator enclosure 450, the flow path 467, as defined by the ductwork section 466, is configured to direct air from the blower 464 through the front opening 438 in the operator enclosure 450, through a front opening (e.g., an inlet 439 coincident with the opening 438) in the instrument panel 484, and into the internal plenum of the instrument panel 484. Once within the plenum, air from the HVAC system 462 can then flow to and out of the vents 486, 488 to heat, cool, or otherwise condition air within the operator enclosure 450. Thus, for example, air flow from the HVAC system 462 can be efficiently routed to the internal volume of the operator enclosure 450, without significant heat loss to (or heat gain from) the surrounding environment and without requiring any air-flow path to extend across a path of movement (not shown) of the lift arm structure 430.

In some embodiments, utilizing a plenum within an instrument panel (e.g., the instrument panel 484) can provide advantages over other approaches. For example, some space within an instrument panel may be otherwise largely unused, and thus can be efficiently used for routing of air, without loss of usable space for an operator within an operator enclosure. Further, because an instrument panel is generally shielded from a lift arm path (e.g., by being disposed entirely within an operator enclosure), it may be possible to direct air flow across the lift arm path, via the instrument panel, without increased risk of damage to the relevant flow equipment due to movement of a lift arm.

As also shown in FIG. 7, in some arrangements the ductwork section 466 can be directly secured to the operator enclosure 450. For example, the ductwork section 466 can include a rigid ducting arrangement that extends from a HVAC housing (not shown) that encloses the blower 464 to a front panel (not shown) of the operator enclosure 450. Such a rigid ducting arrangement can accordingly provide a rigid connection between the HVAC housing and the operator enclosure, as well as the flow path 467 and can correspondingly help to appropriately secure the HVAC system 462 generally forward of the operator enclosure 450.

The vents 486, 488 can be configured in a variety of ways, including with or without louvers or other features to selectively direct or block air flow. In the embodiment illustrated in FIG. 7, the vents 486, 488 are arranged on opposing lateral sides of the operator enclosure 450 (i.e., on opposing sides of the axis 431). However, as also discussed above, the ductwork section 466 and the flow path 467 extend outside of the operator enclosure 450 along only one lateral side of the loader 400 (i.e., along only one side of the axis 431). Accordingly, the flow path 467 may remain generally protected from adverse interactions with the lift arm structure 430, but the routing of air flow through internal plenum of the instrument panel 484 and the vents 486, 488 can still allow air from the HVAC system 462 to be efficiently distributed throughout the operator enclosure 450. In other embodiments, however, other configurations are possible, including other arrangements of vents or plenums within an operator enclosure. For example, some arrangements may route air through structures other than an instrument panel (e.g., dedicated plenums or manifolds) or may include a different number or configuration of vents than is shown in FIG. 7, including vents that are separate from an instrument panel.

As discussed above, and as illustrated in FIG. 7, an HVAC system according to some embodiments, including a blower and an associated ductwork section, can be situated entirely forward of a front wall of an operator enclosure (e.g., of a front wall 436 that includes the front opening 438). Additionally, an HVAC system, including a blower and a ductwork section, can be situated entirely to one lateral side and at least partially rearwardly relative to a lift arm assembly, as well as entirely along one lateral portion of an operator enclosure. In other embodiments, however, other configurations are possible.

Also as illustrated in FIG. 7, a ductwork section of an HVAC system (e.g., the ductwork section 466) may not be integrated into or otherwise extend substantially along (e.g., within) any structural frame members of an operator enclosure (e.g., such as the lower frame 356 of the cab 350 as shown in FIG. 5). As discussed above, this can generally improve the thermal efficiency of HVAC systems as a whole, as well as improving ease of installation and maintenance thereof. In this regard, a front panel that does not provide primary structural support for an operator enclosure is generally not considered to be a structural frame member of the operator enclosure, in contrast, for example, to a support bar of an operator enclosure, such as the support bars forming lower frame 356 of the cab 350 in FIG. 5.

Figure 8:
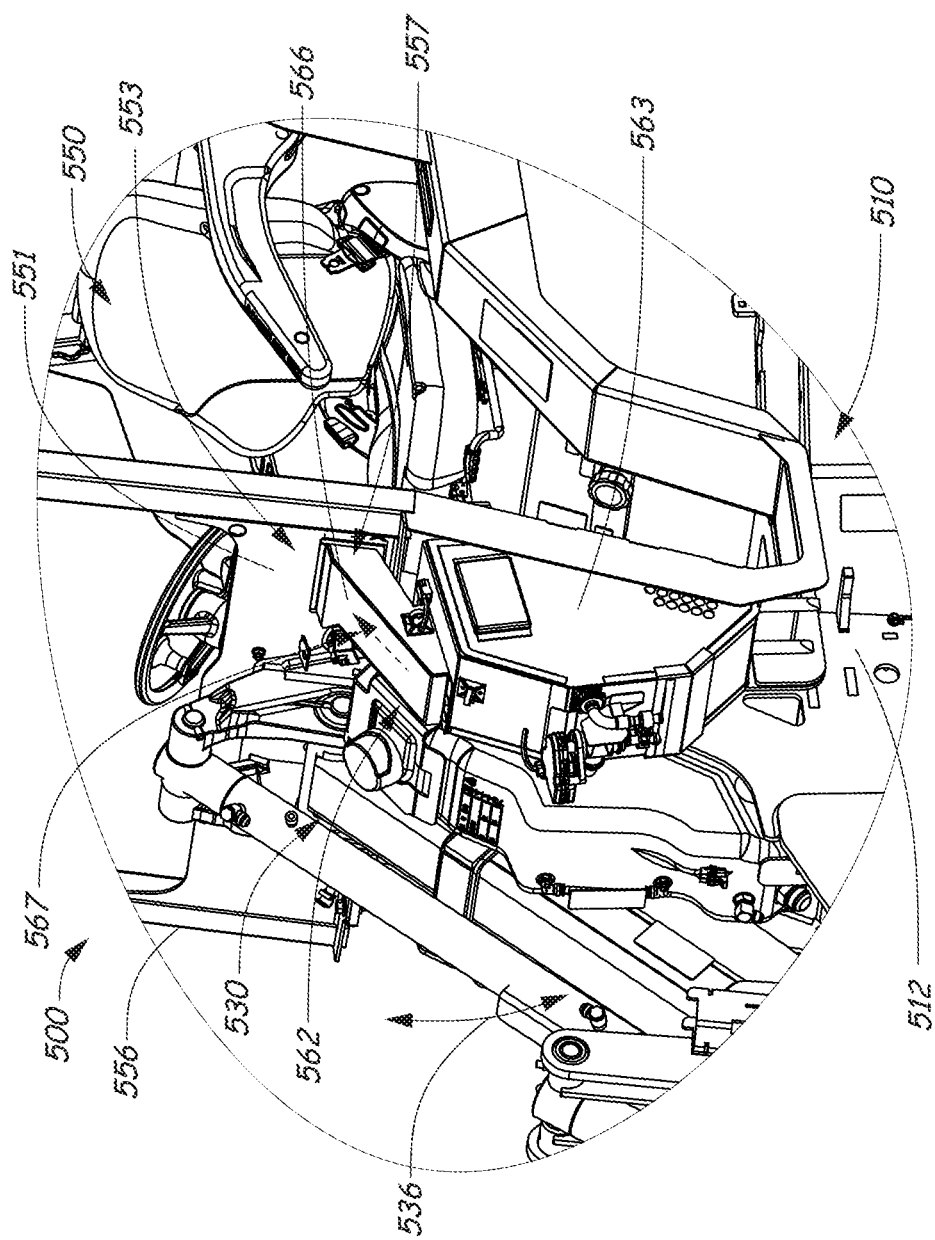
FIG. 8 is a perspective view showing generally a front side of a front part of a power machine in the form of a compact loader, including an HVAC system according to embodiments of the disclosure.
Figure 9:
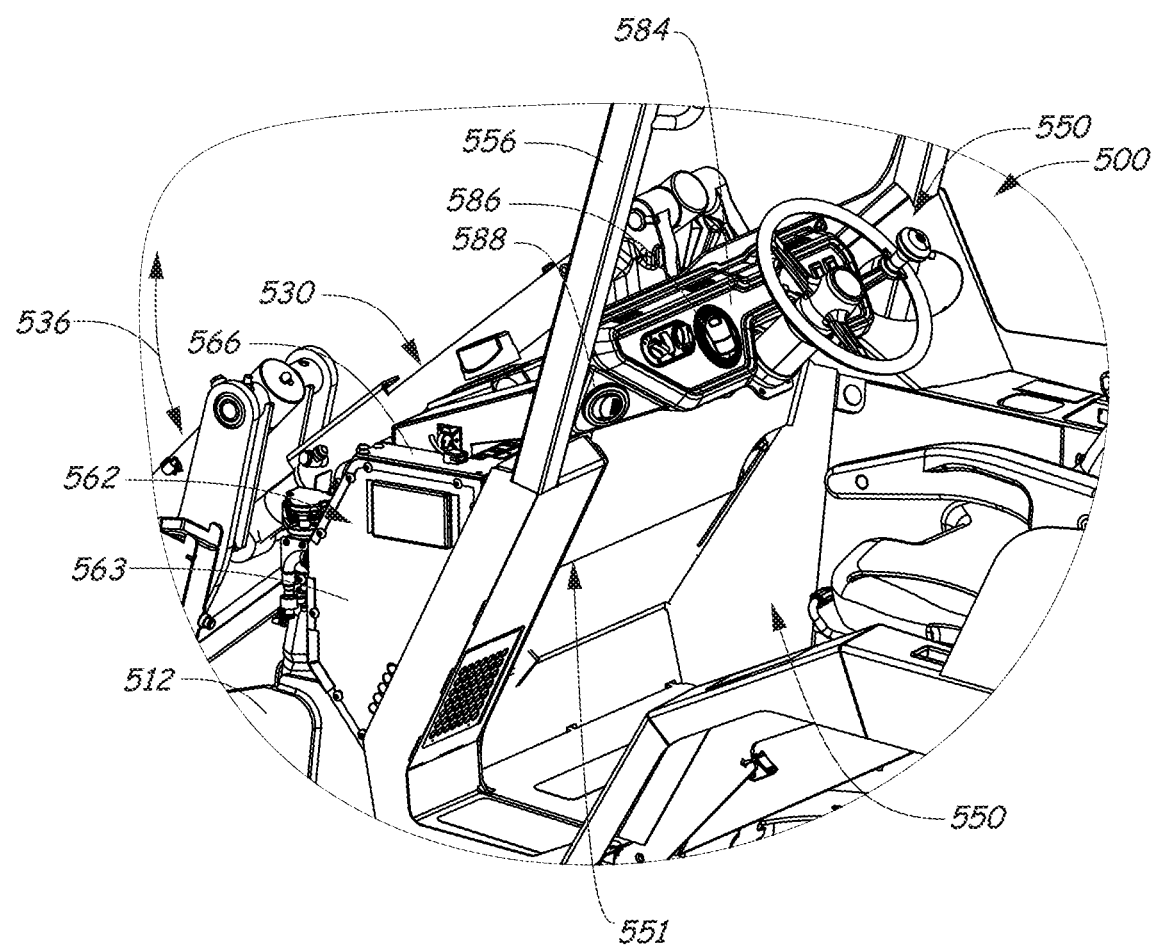
FIG. 9 is a perspective view showing generally a rear side of the front part of the power machine of FIG. 8.

FIGS. 8 and 9 show an example arrangement of an HVAC system 562 for a loader 500, including the arrangement of particular components of the HVAC system 562 on the loader 500. The loader 500 is one particular example of the power machine 100 illustrated broadly in FIG. 1 and discussed above, relative to which the embodiments discussed herein can be advantageously employed. The loader 500 is also similar in some ways to the loaders 200, 300, 400 described above and like numbers represent similar parts. For example, the loader 500 includes an articulated frame 510, a lift arm structure 530, and an operator enclosure 550 that is at least partly defined by a cab. In some embodiments, like the cab 350 and the enclosure 450, the operator enclosure 550 can include a door or windows that are arranged to complete a fully enclosed compartment for the enclosure 550.

To accommodate particular operations, the frame 510 includes a front frame member 512 that supports the operator enclosure 550 and is coupled at an articulated joint (not shown) to a rear frame member (not shown). Accordingly, the front of the loader 500, including the operator enclosure 550, can pivot relative to the rear of the loader, via the articulation joint.

In the embodiment shown in FIGS. 8 and 9, the HVAC system 562 includes an HVAC housing 563 that encloses a blower and other components (not shown), including, in some cases, fluid conduits, heaters, cooling systems (e.g., air conditioning units including compressors, evaporator coils, etc.), humidifiers, dehumidifiers, sensors (e.g., temperature sensors), or other HVAC components known in the art. The HVAC housing 563, along with the blower and other components, is mounted directly (e.g., mechanically secured via fasteners or welding) to a front panel 551 of the operator enclosure 550. The front panel 551 is in turn supported at a front side 553 of the operator enclosure 550 by a frame 556 of the operator enclosure 550. Accordingly, the HVAC housing 563, and the HVAC system 562 generally, is substantially disposed forward of the operator enclosure 550. The HVAC housing 563 and other components of the HVAC system 562 generally are shown as being formed from a metal material, although other materials can be substituted or included.

The HVAC system 562 also includes a ductwork section 566 that is configured as a rigid, continuous metal duct that extends fully between the HVAC housing 563 and the front panel 551 of the operator enclosure 550. In particular, the ductwork section 566 of FIGS. 8 and 9 is configured as a generally rectangular, linearly extending, front-to-back duct, with a cross section that generally increases (e.g., linearly) along an internal flow path 567 that is defined by the ductwork section 566 between the HVAC housing 563 and the operator enclosure 550. In other embodiments, other configurations are possible, including rounded or other cross-sections, non-tapered or otherwise tapered profiles, angled front-to-back (i.e., angling to extend laterally to varying degrees), or non-linearly extending, and so on.

An outlet end of the ductwork section 566 is aligned with an opening 557 in the front panel 551, which is in turn aligned with an inlet to a plenum (not shown) within an instrument panel 584. Accordingly, air flowing along the flow path 567 can pass directly from the HVAC housing 563, substantially through only the ductwork section 566, and into an internal plenum (not shown) of the instrument panel 584. The air can then continue, as appropriate, out of vents (e.g., the vents 586, 588) in the instrument panel 584 and into the larger internal area of the operator enclosure 550. In some embodiments, a deflector (not shown) is provided in the plenum to direct portions of the air flowing into the plenum in different directions.

The HVAC system 562, particularly the HVAC housing 563 and the rigid ductwork section 566, are disposed entirely on one lateral side of the loader 500, relative to the lift arm structure 530 and a path of movement 536 of the lift arm structure 530. Accordingly, the HVAC system 562 can provide a relatively short and direct route for the air-flow path 567 and is also generally arranged to avoid any contact with the lift arm structure 530 as the lift arm structure 530 is operated. Thus, for example, the lift arm structure 530 can be operated without risk of damaging or otherwise detrimental interaction with the HVAC system 562. Further, this benefit may sometimes also be accentuated by the rigid and fixed aspect of the ductwork section 566, which may result in the ductwork section 566 being less susceptible to accidental displacement during operation than conventional, flexible ductwork.

Additionally, by routing air flow through the instrument panel 584 (or other appropriate component) and an appropriate arrangement of vents, such as the vents 586, 588, the HVAC system 562 can still readily provide air flow on both lateral sides of the operator enclosure 550. And, in part due to the arrangement of the ductwork section 566, the HVAC system 562 can also avoid the need to route air flow along the frame 556 of the operator enclosure 550, or other similar component, as may result in substantial heat gain (or loss) in conventional arrangements. This can significantly reduce thermal losses of the HVAC system 562 as a whole, with corresponding benefits to the loader 500 in general, as also discussed above.

In some implementations, devices or systems disclosed herein can be implemented as methods embodying aspects of the invention. Correspondingly, description herein of particular features or capabilities of a device or system is generally intended to inherently include disclosure of a method of using such features for intended purposes and of implementing such capabilities. Similarly, express discussion of any method of using a particular device or system, unless otherwise indicated or limited, is intended to inherently include disclosure, as embodiments of the invention, of the utilized features and implemented capabilities of such device or system.

Figure 10:
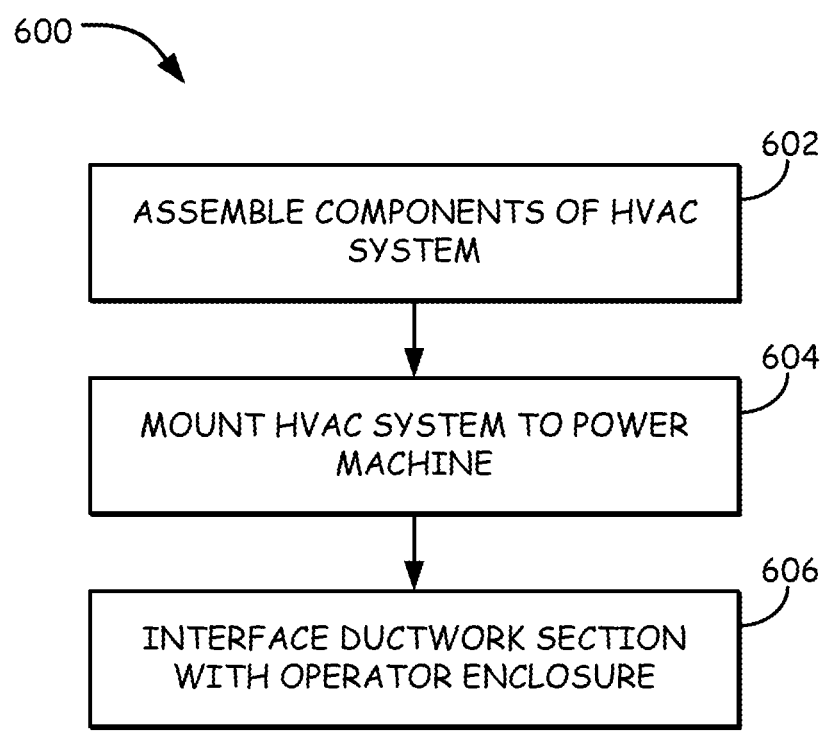
FIG. 10 is a flowchart of a process for installing an HVAC system for a power machine according to embodiments of the disclosure.

In this regard, and as also noted above, some HVAC systems according to this disclosure can be configured to be more easily or efficiently installed than conventional systems. Correspondingly, FIG. 10 shows a flowchart of an example method 600 for installing an HVAC system onto a power machine, according to some embodiments of this disclosure. In some implementations, the method 600 can be used to install embodiments of the HVAC system 562 (see FIGS. 8 and 9) or the HVAC system 462 (see FIGS. 6 and 7), although other implementations are also possible.

In the illustrated example, the method 600 includes assembling 602 components of an HVAC system (e.g., similar to the HVAC system 462, HVAC system 562, etc.) for installation on a power machine (e.g., the loader 400, the loader 500, etc.), mounting 604 the HVAC system to a power machine, and interfacing 606 a ductwork section of the HVAC system with an operator enclosure of the power machine.

In some cases, the assembling 602 operations can include forming or assembling a housing (e.g., similar to the blower housing 563), forming or assembling associated ductwork (e.g., similar to the rigid ductwork section 566), and securing the ductwork to the housing. In some embodiments, such forming or assembly can be completed, in whole or in part, prior to the installation of part or all of the HVAC system on a power machine (e.g., the loader 400). For example, one end of a rigid ductwork section can be secured to a housing using fasteners or other approaches (e.g., welding or adhesives) before the larger assembly, including the housing and the ductwork section, is mounted 604 onto a power machine. As another example, a housing can be mounted 604 to a power machine, after which a ductwork section can be assembled 602 onto the housing.

In some cases, assembling 602 the components of an HVAC system can include integrally forming a ductwork section with a housing so that the housing and ductwork section can be installed as a single component (e.g., without any intermediate assembly). In some cases, a housing can be equipped with other HVAC components (e.g., a blower) before or after the HVAC system is mounted 604 to a power machine.

In some embodiments, as also discussed above, an HVAC system can be mounted 604 to a power machine forward of an operator enclosure and on one lateral portion of a lift arm structure of lift arm path. For example, a housing can be mounted 604 to a front panel of an operator enclosure of a power machine to extend only along the front panel and only to one lateral side of a lift arm structure that is also arranged forward of the front panel. Generally, the mounting 604 of an HVAC system to a power machine can be effected using a variety of devices, including fasteners (e.g., rivets or bolts), welds, and so on.

In different implementations, a ductwork section of an HVAC system can be interfaced 606 with an operator enclosure of a power machine before or after the HVAC system is fully mounted 604 to the power machine. In some cases, a ductwork section can be interfaced 606 (e.g., directly connected) with an operator enclosure at a front opening of the operator enclosure. For example, in implementations in which an HVAC system is mounted 604 to extend only along a front panel of an operator enclosure and only along one lateral portion of the operator enclosure, a ductwork section of the HVC system can be secured to route air directly into a front opening on the front panel in order for the air to enter the operator enclosure. In some implementations, such as when an HVAC system is assembled 602 to include a ductwork section before being mounted 604 to a power machine, the entire HVAC system can be mounted 604 as an integral unit, with the operations to mount 604 the HVAC system including operations to interface 606 the ductwork section with an operator enclosure. In some implementations, a ductwork section can be interfaced 606 with an operator enclosure so as to define a flow path through the ductwork section, between a blower housing and the operator enclosure, that does not extend within or along any structural frame member of the operator enclosure or that extends substantially only through the ductwork section.

As another example, some embodiments according to this disclosure can include HVAC methods for an operator enclosure of a power machine. For example, a method for cooling or heating an operator enclosure of a power machine can include heating or cooling air and activating a blower within a ventilation system to drive the heated or cooled air along a flow path into the operator enclosure. In some embodiments, the flow path can be configured to direct the heated or cooled air along only one lateral portion of the operator enclosure of the power machine. In some embodiments, the flow path may not extend through any portion of a support frame of the operator enclosure. In some embodiments, the flow path can extend substantially only through a rigid ductwork section that extends only along a front panel of the operator enclosure or only along one lateral portion of the operator enclosure. In some embodiments, the flow path may not extend laterally across a path movement of the lift arm structure, at least for any portion of the flow path that is forward of the operator enclosure.

The embodiments above can provide several advantages. For example, use of a rigid ductwork section arranged at a front of an operator enclosure can reduce the length of an air-flow path from components of an HVAC system to an operator enclosure, while also potentially eliminating the need to route the air flow along frame members of the operator enclosure. This can result in significantly improved thermal performance of HVAC systems relative to conventional arrangements. As another example, a flow path from a blower of an HVAC system to an operator enclosure can be arranged to extend only along one lateral side of a lift arm structure. This can be useful, for example, to protect the flow path from adverse interaction with the lift arm structure, such as may result in reduced or blocked air flow or other detrimental effects.

Although the present invention has been described with reference to preferred embodiments, workers skilled in the art will recognize that changes may be made in form and detail to the disclosed embodiments without departing from the spirit and scope of the concepts discussed herein.

What is claimed is:

1. A power machine comprising:
an articulated frame with a front frame member and a rear frame member that support the power machine relative to the ground, the front frame member being configured to pivot relative to the rear frame member about a vertical pivot axis of the power machine;
an operator enclosure supported on the front frame member, the operator enclosure being configured to pivot with the front frame member relative to the rear frame member and including an enclosure frame and an operator station that is at least partly enclosed by the enclosure frame;
a lift arm structure arranged forward of the operator enclosure and configured to move relative to the front frame member under power, with first and second lateral portions of the operator enclosure being defined on opposing lateral sides, respectively, of a path of travel of the lift arm structure; and
a heating, ventilating, and air conditioning (HVAC) system that includes:
an HVAC housing that is supported on the operator enclosure at least partly forward of the operator enclosure;
a blower fan within the HVAC housing; and
a rigid ductwork section arranged between the HVAC housing and a front opening in the operator enclosure to direct air from the blower fan along a flow path from the HVAC housing to the front opening in the operator enclosure;
the flow path extending on only the first lateral portion of the operator enclosure; and
the rigid ductwork section not including any portion of the enclosure frame.

2. The power machine of claim 1, wherein the front opening in the operator enclosure is aligned with an inlet to a plenum; and
wherein air directed into the plenum via the flow path is directed by the plenum, within the operator station, laterally across the path of travel of the lift arm structure to the second lateral portion of the operator enclosure.

3. The power machine of claim 2, wherein the plenum is at least partly within an instrument panel of the operator station and directs air to a first vent within the first lateral portion of the operator enclosure and to a second vent within the second lateral portion of the operator enclosure.

4. A power machine comprising:
an articulated frame with a front frame member and a rear frame member, the front frame member being configured to pivot relative to the rear frame member;
an operator enclosure supported on the front frame member to define an operator station and configured to pivot with the front frame member about relative to the rear frame member and about a vertical axis of the power machine;
a lift arm structure arranged forward of the operator station and configured to move relative to the front frame member under power, the lift arm structure defining opposing first and second lateral portions of the operator enclosure; and
a heating, ventilating, and air conditioning (HVAC) unit supported on the front frame member at least partly forward of the operator enclosure and including:
an HVAC housing;
a blower fan within the HVAC housing; and
a rigid ductwork section arranged to direct air from the blower fan along a flow path from the HVAC housing to a front opening in the operator enclosure.

5. The power machine of claim 4, wherein the HVAC unit extends along only one of the first and second lateral portions of the operator enclosure.

6. The power machine of claim 5, wherein the HVAC unit is mounted to and positioned forward of a front wall of the operator enclosure, the front wall being forward of the operator station and including the front opening.

7. The power machine of claim 6, wherein the HVAC unit directs air from the HVAC housing to the front opening only along the front wall of the operator enclosure.

8. The power machine of claim 4, wherein the rigid ductwork section does not form part of a support frame of the operator enclosure.

9. The power machine of claim 8, wherein the flow path extends substantially through only the rigid ductwork section between the HVAC housing and the front opening.

10. The power machine of claim 4, wherein the lift arm structure defines a path of movement for a lift arm; and
wherein the flow path between the HVAC housing and the front opening does not extend laterally across the path of movement.

11. The power machine of claim 10, wherein the operator station includes a plenum in fluid communication with a first vent and a second vent to direct air into the operator station, and
wherein the first vent is within the first lateral portion of the operator enclosure and the second vent is within the second lateral portion of the operator enclosure.

12. The power machine of claim 11, wherein the HVAC housing and the rigid ductwork section extend along only one of the first and second lateral portions of the operator enclosure.

13. A heating, ventilating, and air conditioning (HVAC) system configured to interface with a front opening in a front side of an operator enclosure of a power machine with an articulated frame, the HVAC system comprising:
a housing configured to be supported on a front frame member of the power machine forward of the operator enclosure;
a blower fan within the housing; and
a ductwork section connected to the housing and configured to direct air from the blower fan along a flow path from the housing to the front opening in the operator enclosure, the ductwork section is a rigid ductwork section with a first end coupled to the housing and a second end configured to be mounted to a front wall of the operator enclosure.

14. The HVAC system of claim 13, wherein the housing is configured to extend only along a first of two opposing lateral portions of the operator enclosure when the housing is mounted to the front wall.

15. The HVAC system of claim 14, wherein the ductwork section is configured so that the flow path extends only along the first lateral portion of the operator enclosure when the housing is mounted to the front wall.

16. The HVAC system of claim 15, wherein the two opposing lateral portions of the operator enclosure are defined on respective opposing sides of a lift arm path of the power machine; and
wherein the ductwork section is configured to not extend laterally across the lift arm path when the housing is mounted to the operator enclosure.

17. The HVAC system of claim 16, wherein the flow path extends substantially only through the ductwork section.

18. The HVAC system of claim 13, wherein the ductwork section is a rigid ductwork section with a first end connected to the housing and a second end configured to connect to a front wall of the operator enclosure.

19. The HVAC system of claim 18, wherein the rigid ductwork section does not form part of a support frame of the operator enclosure and is not coextensive with the support frame of the operator enclosure.

20. The HVAC system of claim 19, wherein the HVAC housing and the ductwork section are configured to direct air from the blower fan only along a front wall of the operator enclosure and only along a first of two opposing lateral portions of the operator enclosure defined by a lift arm path of the power machine, when the housing is secured to the operator enclosure.

* * * * *